(12) United States Patent
Bjoerkman et al.

(10) Patent No.: US 7,388,867 B2
(45) Date of Patent: Jun. 17, 2008

(54) DATA NETWORKS

(75) Inventors: Nils Bjoerkman, Farsta (SE); Simon Andrew Crosby, Cambridge (GB); Alexander Latour-Henner, Farsta (SE); Ian Malcolm Leslie, Cambridge (GB); John Trevor Lewis, Dublin (IE); Fergal William Toomey, Dublin (IE); Raymond Philip Russell, Dublin (IE)

(73) Assignee: Corvil Limited, Dublin (IE)

(*) Notice: Subject to any disclaimer, the term of this patent is extended or adjusted under 35 U.S.C. 154(b) by 560 days.

(21) Appl. No.: 10/870,444

(22) Filed: Jun. 18, 2004

(65) Prior Publication Data
US 2005/0152272 A1 Jul. 14, 2005

Related U.S. Application Data

(63) Continuation of application No. 10/338,896, filed on Jan. 9, 2003, now abandoned, which is a continuation of application No. 09/377,613, filed on Aug. 19, 1999, now Pat. No. 6,580,691, which is a continuation-in-part of application No. PCT/IE98/00013, filed on Feb. 19, 1998.

(30) Foreign Application Priority Data

Feb. 19, 1997 (GB) .................. 9703425.0

(51) Int. Cl.
H04L 12/28 (2006.01)
H04J 1/16 (2006.01)
H04Q 7/00 (2006.01)
H04B 1/66 (2006.01)

(52) U.S. Cl. .......... 370/395.21; 370/232; 370/332; 375/240

(58) Field of Classification Search ........ 370/230–235, 370/238–238.1, 236–237, 248, 252–253, 370/332, 395.21; 375/240; 455/452.2; 379/114.07
See application file for complete search history.

(56) References Cited

U.S. PATENT DOCUMENTS

| 5,812,526 | A | * | 9/1998 | Chang et al. ............... 370/230 |
| 6,028,840 | A | * | 2/2000 | Worster ...................... 370/230 |
| 6,041,039 | A | * | 3/2000 | Kilkki et al. ............... 370/230 |
| 6,046,981 | A | * | 4/2000 | Ramamurthy et al. ...... 370/232 |

(Continued)

OTHER PUBLICATIONS

N.G Duffield, J.T. Lewis, N. O'Connell, R. Russell and F. Toomet. Entrophy of ATM Traffic Streams: A tool for Estimating QoS Parameters. In IEEE Journal on Selected Areas in Communications, vol. 13(6), Aug. 1995/ pp. 981-990.*

(Continued)

*Primary Examiner*—Gilberto Barron, Jr.
*Assistant Examiner*—Hadi S Armouche
(74) *Attorney, Agent, or Firm*—Schwabe, Williamson, & Wyatt P.C.

(57) ABSTRACT

A data network in which at least one switch is provided with the facility for estimating current network demands using a polygonal approximation to scaled cumulant generating function. The approximation is iteratively refined in accordance with sampled data passing through the switch. The switch estimates the demand associated with a new data processing request as it is received by the switch and decides whether to accept the request based on available resources.

30 Claims, 2 Drawing Sheets

U.S. PATENT DOCUMENTS

| | | | |
|---|---|---|---|
| 6,072,773 A | * | 6/2000 | Fichou et al. ............... 370/230 |
| 6,081,505 A | * | 6/2000 | Kilkki ........................ 370/230 |
| 6,331,970 B1 | * | 12/2001 | Nieh et al. .................. 370/230 |
| 6,338,046 B1 | * | 1/2002 | Saari et al. ................... 705/34 |
| 6,442,164 B1 | * | 8/2002 | Wu ....................... 370/395.21 |
| 6,580,691 B1 | * | 6/2003 | Bjoerkman et al. ......... 370/232 |

OTHER PUBLICATIONS

Crosby et al, "Predicting bandwidth requirements of ATM and Ethernet traffic" Feb. 26, 1996, pp. 1-10.*

I. Cozzani, S. Giordan, S. Merlini, G. Procissi, and S. Tartarelli, "Sub-Optimal Measurement-Based CAC Algorithm", pp. 1-12, 1996.*

J. Olsen and R. Gaigalas, "Large Deviation Techniques Used for Analysis of Flow Control in a Single-server Network", Jan. 19, 2000, pp. 1-16.*

R. Russell, "The Large Deviations of random time-changes", School of Mathematics, University of Dublin, Trinity College, Sep. 1997.*

Large deviations theory- http://www.wikipedia.org/, pp. 1-3, 2007.*

N.G. Duffield, "Economies of scale for long- range dependent traffic in short buffers", Telecommunication Systems, vol. 7, Nos. 1-3, Jun. 1997, pp. 267-280.*

Yasuhiro Miyao, "Bandwidth Allocation in ATM Networks that Guarantee Multiple QoS Requirement", IEEE International Conference on Communications, 1993. ICC 93. Geneva. Technical Program, Conference Record, vol. 3, May 26, 1993, pp. 1398-1403.*

Duffield et al, Journal of Selected . . . , vol. 13, No. 6, "Entrophy of ATM Traffic Streams . . . ", Aug. 1995, pp. 981-990.

Crosby et al, "Predicting bandwidth requirements of ATM and Ethernet traffic", Feb. 26, 1996, pp. 1-10.

Hideaki Arai et al., "Analysis of Call Admission Control in the ATM Network," Electronics and Communications in Japan, Part 1, vol. 73, No. 10, 1990, pp. 42-51.

Richard Black et al., "Experiences of building an ATM switch for the Local Area," ACM SIGCOMM Computer Communication Review archive, vol. 24, Issue 4, Oct. 1994, pp. 158-167.

Ian Leslie et al., "Fairisle: An ATM Network for the Local Area," ACM SIGCOMM Computer Communication Review archive, vol. 21, Issue 4, Sep. 1991, pp. 327-336.

Faramak Vakil, "A Capacity Allocation Rule for ATM Networks," Global Telecommunications Conference, 1993, including a Communications Theory Mini-Conference. Technical Program Conference Record, IEEE in Houston. GLOBECOM '93., IEEE, Nov. 29-Dec. 2, 1993, vol. 1, pp. 406-416.

* cited by examiner

DATA NETWORKS

This is a Continuation of application Ser. No. 10/338,896 filed Jan. 9. 2003; now abandoned which in turn is a Continuation of application Ser. No. 09/377,613 filed Aug. 19, 1999 now U.S. Pat. No. 6,580,691; which in turn is a continuation-in-part of PCT/IE98/00013 filed Feb. 19, 1998.

The present invention relates generally to data networks and more particularly to the design and management of such networks.

For the purposes of this specification the term data network is taken to include any network in which signals originate from a multiplicity of sources. These signals may be in a variety of formats other than the digital packet arrangements associated with local area networks, Internet and intranet applications and may also include telephone networks, cable TV, cellular and satellite communications.

Controlling congestion on high-speed networks is becoming increasingly difficult and expensive. In the case of the Internet, it would historically have been impossible to predict the impact that the provision of services, such as the World Wide Web (WWW) would have generated. The traffic explosion which is now apparent and the extraordinary demand for new services means that bandwidth optimisation is now imperative for any network operator.

Asynchronous Transfer Mode (ATM) in which signals are broken up into small cells of uniform size to carry voice, data and video across a network through ATM switches is widely used and is particularly suited to the present invention. The ATM switches at each network node operate at great speed to read the address of an incoming cell and direct it to an, appropriate destination. The ongoing challenge to the operators of such networks is the effective management of system resources particularly in light of the increasing number of "bandwidth-hungry" applications.

All networks including ATM networks are of their nature bandwidth limited to some level therefore when the network is asked to communicate a new signal or a set of signals it is essential to accurately determine whether the request can be reliably processed without overloading the capacity of the network.

In connection oriented networks, this determination is sometimes referred to as connection admission control (CAC), and relies on knowledge about the behaviour of both the current signals on the network and of the new signal or signals. When a request is received for a new traffic stream to enter a network, the network will attempt to route that stream through a sequence of switches similar to the ATM switches already mentioned. There may be several different possible routes through the network and the network may have a means of choosing from among them. However, for transmission failure intolerant or time dependent networks a new stream can be handled along a particular route if and only if the sum of resource requirements, that is the current and new, at each switching point along the route does not exceed that switching point available resources. Thus, the present invention may be applied independently at each switching point in the network to determine whether resources will be exceeded at that point if the new stream is accepted.

The subsequent description will refer to connection admission at a particular point in the network.

The first known way of determining whether a new traffic stream can be handled by a network carrying existing traffic streams is to determine the peak resource requirement of each traffic stream. Then, the current capacity of the network used by the existing streams is represented by the sum of their peak requirements, and a new traffic stream can be handled by the network if its peak requirement plus the sum of the peak requirements of the existing streams does not exceed the maximum capacity of the network. This approach to connection admission control is referred to as "allocation on peak".

In networks where the peak requirement is its usual requirement, this is a simple and efficient method. For example, in a digital telephone network, the peak requirement of a call corresponds its usual requirement so that connection admission control is relatively straight forward. However, in situations where the requirements of a traffic stream vary during the time that stream is being carried by the network, then the method of allocation on peak is potentially wasteful. If, in practice, only a small number of the existing traffic streams are at their peak requirements, there will be a difference between the sum of the peak requirements and the actual capacity of the network used by the traffic streams at any particular time. If allocation on peak was then used as the connection admission control, the control system may prevent a particular signal being handled by the network, when, in fact, the network had sufficient capacity to handle that signal.

Therefore, techniques have been developed which take into account statistical variation of each of the traffic stream, to determine network demands associated with existing traffic streams. The bandwidth requirement per source can be greatly reduced by mixing traffic from many sources. The likelihood of peak demand from all traffic sources occurring simultaneously is small therefore using statistical multiplexing it is possible increase the number of signals which may be carried by the network.

Statistical multiplexing is made possible by the use of buffers in which cells can be stacked in queues, waiting to be processed by the switch. These buffers allow "source modelling", to be implemented. This source modelling requires a statistical model to be derived from each carried traffic stream to obtain the statistical properties of the traffic streams as a whole. Each statistical model is a mathematical model containing a number of adjustable parameters. The model is then fitted to a respective stream by observing the traffic over a period of time as it passes through the buffers, deducing its statistical properties, and adjusting the parameters of the model to reproduce these. There is an obvious risk that buffers will occasionally overflow, leading to cell-loss, or that long queues will build up, causing unacceptably long transmission delays and the goal is to achieve the gain from statistical multiplexing while avoiding the consequences of congestion.

Where the behaviour of a traffic stream is easily captured by such a model, and where the number of different traffic streams is limited, this source modelling approach may prove satisfactory.

However, in situations where it is difficult to model the behaviour of a traffic stream, or when the number of different types of traffic streams is high, the derivation of appropriate models is computationally demanding. Thus, parametric modelling is unsatisfactory because of the wide variety of traffic types offered to the network, the difficulties in modelling burstiness and the time required to fit parameters. For example, multimedia sources require highly complex models to capture their statistical properties. In situations where the number of source or traffic stream types is large and where sources may adjust their behaviour in response to user input, or network conditions, source modelling does not work satisfactorily.

There is therefore a need for a network which will overcome the aforementioned problems.

SUMMARY OF THE INVENTION

Accordingly there is provided a data network of the type having at least one network switch, the network switch incorporating means for receiving data from more than one network source and means for onward transmission of said data characterised in that the network switch further incorporates means for processing and analysing data from each network source and abstracting a data characteristic from the analysed data.

Preferably the switch incorporates means for receiving a new data processing request from the network source.

Preferably the means for receiving the new data processing request incorporates means for processing, analysing and deriving a data model from the data processing request.

Ideally the switch includes a decision manager, the decision manager comprising:—
  means for determining a maximum allowable switch throughput parameter;
  an integration device for combining the data model and the data characteristic to produce a switch throughput indicator; and
  a comparator for comparing the switch throughput indicator and the maximum switch throughput parameter.

In one arrangement the decision manager incorporates:—
  a real time processor for comparing the comparator output and the data model with a pre-defined acceptance table to define a request response; and
  means for transmitting the request response to the network source.

Preferably the means for abstracting the data characteristic incorporates a measurement apparatus having means for approaching a scaled cumulant generating function.

Preferably the measurement apparatus is an in-line device.

In a preferred arrangement the in-line device operates in real time and uses random blocks of time for approximating the scaled cumulant generating function.

Preferably the in-line device incorporates a throughput buffer.

Preferably the measurement apparatus further includes an estimator for analysing the new data processing request using an estimating operation to estimate the data model.

Ideally the estimator incorporates means for approximating a scaled cumulant generating function.

Preferably the modelling apparatus is an in-line device.

In a preferred arrangement the in-line device operates in real time and uses random blocks of time for the scaled cumulant generating function.

Preferably the in-line device is provided by a modelling buffer.

Preferably the network switch incorporates a revision processor for periodically refreshing the data characteristic.

Preferably the revision processor is connected to the decision manager for receiving the request response.

Preferably the network comprises a plurality of interconnected switches linking the network source to a network target.

Preferably each network switch between the network source and the network target incorporates means for generating and communicating a request response to the network source in response to a network target access request from the network source.

Preferably the switch is a gateway switch for communication with another network.

According to one aspect of the invention there is provided a data network of the type having at least one network switch, the network switch incorporating means for estimating a current resource demand requirement of network traffic in a queue, said means operating in line between a switch input and a switch output and incorporating means for approximating a scaled cumulant generating function to estimate the resource demand requirement.

Preferably the estimation of the scaled cumulant generating function is achieved using an arbitrary sequence of random times of network traffic in the queue.

Preferably the measured estimation of the scaled cumulant generating function is achieved using a random series of data blocks from the queue.

Preferably the data characteristic is abstracted according to $$\hat{\delta}(s) = \max\{\theta : \hat{\lambda}^{(T)}(\theta) \leq 0\}$$

Preferably the switch incorporates means for receiving a data processing request said means having a parametric estimator for identifying the data model for the data processing request.

According to another aspect of the invention there is provided a data network of the type having at least one network switch incorporating means for estimating a current source demand requirement of network traffic in a queue comprising means for generating an initial polygonal approximation and means for iteratively refining said polygonal approximation to a scaled cumulative generating function in response to sampled data.

Preferably the initial polygonal approximation is generated from declared parameters.

According to another aspect of the invention there is provided a data network performance management system for managing communications in a network comprising
  means for receiving data from a network source on the network;
  means for onward transmission of the data to the other network;
  means for processing, analysing and abstracting a data characteristic from the data;
  a decision manager, the decision manager comprising:—
  means for determining a maximum switch throughput parameter;
  an integration device for combining the data model and the data characteristic to produce a switch throughput indicator and
  a comparator for comparing the switch throughput indicator and the maximum switch throughput parameter;
  a real time processor for comparing the comparator output and the data model with a pre-defined acceptance table; and
  means for transmitting a request response to the network source.

Preferably the network performance management system as claimed in claim 26 wherein the means for processing, analysing and abstracting a data characteristic from the data incorporates:—
  means for approximating a polygonal approximation; and
  means for iteratively refining said polygonal approximation to a scaled cumulative generating function in response to analysed data.

According to another aspect of the invention there is provided a method for managing the performance of a data network comprising the steps of:— processing, analysing and abstracting a data characteristic for data passing through a switch node of the data network;

receiving a data processing request from a network source;

processing, analysing and deriving a data model from the data processing request;

combining the data model and the data characteristic to produce a switch throughput indicator;

identifying a maximum allowable switch throughput parameter;

comparing the switch throughput parameter and the switch throughput indicator to produce a request response; and communicating the request response to the network source.

Preferably the method further comprises the steps of:— accepting a data request from a network source; and generating a new data characteristic.

Ideally the step of processing, analysing and abstracting the data characteristic comprises the steps of:— generating a polygonal approximation;

isolating a segment of data passing through the switch node; and iteratively analysing a random series of blocks of the data for refining the polygonal approximation to a scaled cumulative generating function.

Preferably the blocks are analysed using an arbitrary sequence of random times.

Therefore, the present invention seeks to provide a method of connection admission control (CAC) which permits more complex systems to be handled than the known arrangements. At its most general, the present invention proposes that an estimate is made of the demand on the system from the current traffic stream, based on estimation functions, determined in real time using on-line measurement. An estimate is also made of the requirement of a new traffic stream, based on a readily available parameter of that traffic stream, and the results of the two estimates used to determine whether the new traffic stream can be handled by the network. If the likelihood of the network being unable to handle all the traffic streams is low enough, the stream is accepted. Once the new stream has been admitted to the network, the on-line measurement of the existing streams then takes into account the new stream in any subsequent processing.

Normally, a network has a plurality of interconnected switching points, and each switching point will usually have a processing function associated with that switching point. Therefore, the present invention is normally applied to each switching point, so that for each switching point an estimate is made of the demand on the system from the current traffic stream at that switching point and also an estimate is made of the requirement of a new traffic stream at that switching point. The result of the two estimates are then used at the switching point to determine whether the new traffic stream can be handled by the switching point, or not.

Usually, a signal to be handled by the network will pass from the origin of that signal to its destination via a plurality of switching points. In such a situation, it is preferable for the connection admission control of the present invention to be applied at each switching point and the signal passed from its source to its destination only if it is determined that the network is able to handle all the traffic streams, including the new one, at all switching points.

The present invention is not limited to arrangements in which demands on the system is determined at each switching point. An alternative is to provide measurement devices connected to the transmission links of the network, which monitor signals on the corresponding transmission links of the network and control the signals of that transmission link, either directly or by passing information to agents elsewhere in the network which control the signals of that transmission link, on the basis of the connection admission control of the present invention.

DETAILED DESCRIPTION OF THE INVENTION

Figure 1:
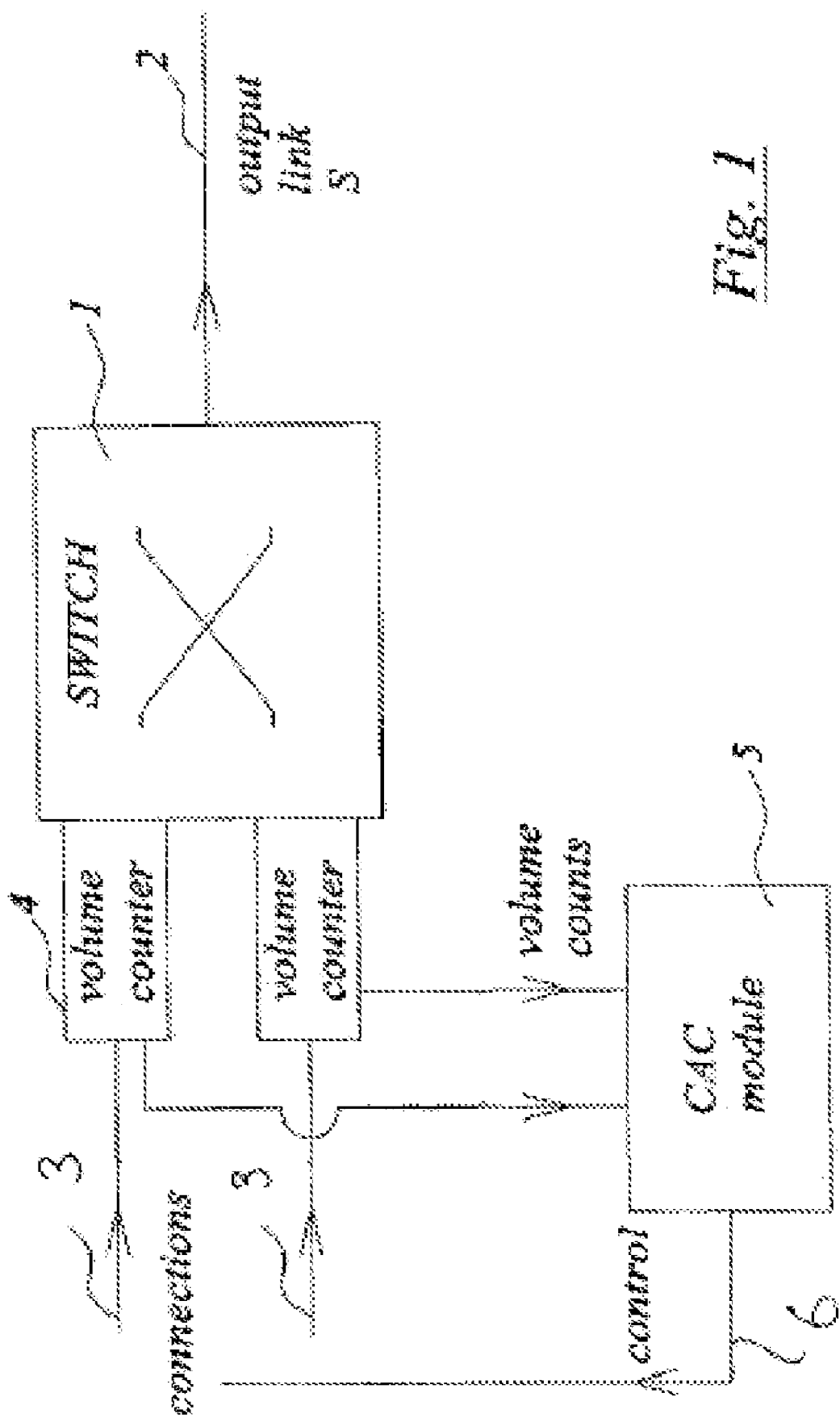
FIG. 1 is a diagrammatic representation of some parts of a network.

While the actual physical representation of the connections to and from a switch and the connections to any apparatus such as a computer, programmed chip, or the like will be easily appreciated it is at the same time advantageous to represent it graphically and thus reference is made to FIG. 1 which illustrates a switch 1 having an output link 2 and a plurality of input multiplex current connections 3 each feeding a traffic volume counter 4. The volume counter 4 feeds a control admission module (CAC) 5 which in turn feeds a control signal for admission control by a line 6 to a source not shown.

The volume counter 4 and in particular the CAC 5 contain the majority of the various means for carrying out the invention. The means will generally be devices, chips, computer memory etc. which can carry the software to provide the invention.

Within this broad principle stated above, the present invention has a number of aspects. The first aspect concerns the way of estimating the demands of the current traffic streams. For existing streams converging at a switching point in the network, elements of information belonging to a stream will be buffered until they can be transmitted on an outgoing link to another switching point, or the ultimate destination of the information. Two cases arise.

1. An outgoing transmission link is fed by a single buffer: The buffer of any particular switch will have maximum size hereinafter denoted by "b", although the maximum size of different buffers may themselves differ. Transmission from the buffer to the outgoing link is performed at the constant transmission rate of the outgoing link. This transmission rate is denoted hereinafter by "s" and is sometimes referred to as the service rate.

2. An outgoing transmission link is fed by several buffers subject to some service policy which determines, at each point in time, which buffer is to supply the signal to be transmitted on the link in this case, the current invention still applies, as long as each buffer has a maximum size. The current invention is applied to each buffer has a maximum size. The current invention is applied to each buffer to find a resource demand of the current traffic for each buffer. The new traffic stream is considered with respect to the buffer that it will traverse to derive an estimate of its resource requirement. The total estimated resource requirement for the output link being considered is the sum of the existing resource requirements for each buffer plus the resource requirement of the new traffic.

Thus, for the purpose of estimating the resource requirements of the current traffic, each buffer may be considered independently with the service rate s from a buffer considered to be variable. A new traffic stream will only enter one of a set of buffers feeding an outgoing transmission link. At its broadest, the present invention is applied at any point in a network at which the traffic demand is measurable, such point including not only switches but also measurement devices or transmission links between switches. Therefore, the present invention may be applied to at least one buffer at least one switch in a network. The invention is preferably applied to all switches, and preferably to all buffers of any switch that has a plurality of buffers.

The stochastic process which describes the arrival of information elements into the queue is called the traffic arrival process. In one particular form known as the workload process, $W_t$ describes the amount of work added to the queue between time O and time t. If $$P\{W_t/t > x\} \asymp e^{-tI(x)}$$

for some I(x) then the workload process obeys a Large Deviation bound and I(x) is known as the rate function. (here the symbol $\asymp$ denotes asymptotic convergency.

From mathematical principles, it is possible to determine from source models a rate function of the existing traffic streams on the network. However, rate functions can be determined indirectly from on-line measurements. The rate function of the traffic streams is directly related to a mathematical function known as the "scaled cumulant generating function" (hereinafter SCGF) which can be estimated by on-line measurement. One known technique for estimating the SCGF involves a time-division of signals into a number of blocks of a fixed period. An example of such a way of estimating a SCGF has been published in an article entitled "Entropy of ATM traffic streams: a tool for estimating quality of service parameters" by N. G. Duffield et al in the IEEE Journal of Selected Areas in Communications, special issue on Advances in the Fundamentals of Networking, Vol 13 (1995) pages 981 to 990. However, it has been realised that an alternative method may make use of any arbitrary sequence of random times $\{T_n\}$. The SCGF, $\lambda(\theta)$ for an arrivals process A can be estimated as $$\hat{\lambda}^{(A)}(\theta) = \frac{1}{T} \ln \frac{1}{K} \sum_{k=1}^{K} e^{\theta X_K}$$

where $X_k$ is the number of arrives in the $k^{th}$ block of time and s is the service rate at which the buffer is drained.

Thus, the use of this estimator function to determine the SCGF and so permit an estimation of the existing traffic streams to be made by way of on-line measurement, represents a first aspect of the present invention.

The estimator used differs from the known estimators in that it considers time in a random series of blocks, rather than blocks of fixed length.

The second aspect of the present invention is concerned with the characterising of the requirements of a newly arriving stream. In the known source, modelling a statistical model is derived for each traffic stream. In the second aspect of the present invention, however, a more crude parameter is used which is more readily available. Examples of such parameters are the peak rate, the mean burst size, the burstiness of the traffic stream, or the second moment of the cell inter-arrival times. All these parameters, known in themselves, represent satisfactory ways of characterising the newly arriving traffic stream, when used in combination with SCGF estimated either from the first aspect of the present invention, or indeed from other estimations.

The third aspect of the present invention also concerns the estimate involved in determining the SCGF, and is based on the realisation that, in order to provide satisfactory results, it is necessary to provide bounds or limits on the SCGF, to ensure that the estimators have finite variance. This problem has not been realised in the past, but by bounding the estimators, improved statistical reliability can be achieved. In particular, for values of $\theta$ greater than some given $\theta_0$, the estimate of the SCGF is replaced by a linear function determined by the peak rate or line rate.

In order to determine $\theta_0$, it is desirable to take into account the sizes of buffers within the network and the smallest cell-loss ratio with which the system needs to deal. This may be the lowest cell-loss that the system offers or, in the case of short-lived connections, the smallest cell-loss ratio that could be observed, which is the inverse of the total number of cells transmitted.

$$\frac{\ln(\text{minimum } CLR)}{\text{buffer-size}}$$

This third aspect can be used in combination with the first or second aspects of the present invention, but is itself an independent aspect of the present invention.

The various aspects of the present invention permit several different advantages to be achieved. In particular:

1. No explicit source model is required; the only assumption made about the source of the data is that their outputs can be described by random processes which are stationary and weakly dependent on the relevant time-scales;
2. Measurement can be of a complete mix of traffic as well as individual traffic streams. In particular, the bulk properties of the traffic are characterised directly, but the properties of individual streams can also be derived;
3. Since very weak assumptions about the statistical nature of the traffic are made, all existing communications services and any new services which may be developed in the future, can be treated in a uniform way. The method is thus service independent;
4. Only those properties relevant to the connection admission control algorithm are estimated;
5. The method can be applied to any work conserving multiple buffer schemes, not just a single FIFO queuing scheme;
6. The method is robust even for non-stationary traffic, so long as it exhibits stationarity on the time scales over which estimation can be performed.

An embodiment of the present invention will now be described in detail, by way of example, with reference to the accompanying drawing, in which the sole figure shows a switch for a network which controls signals at the switch in accordance with the present invention.

Before describing a switch which incorporated the present invention, it is desirable first to understand the mathematical background which has led to the considerations underlying the present invention.

Whether or not a network can handle a mix of traffic can be reduced to the problem of characterising the properties of a mix of traffic streams arriving at a queue. In order to determine this, it is necessary to consider the probability that the queue length exceeds certain thresholds. These probabilities can be related to delay and loss characteristics.

The probability that a queue length Q exceeds some particular value q is hereinafter denoted by P[Q>q]. If the traffic satisfies a large deviation principle then $$P[Q>q] \asymp e^{-\delta q}$$

for some δ, where "≍" denotes asymptotic convergence. Also, we denote by CLR(b;s) the cell-loss ratio which occurs in a buffer of size b when it is served at a constant rate s:

$$CLR(b; s) := \frac{E[(X-s)I_{\{Q=b\}}]}{E[X]}$$

Thus, the cell-loss per unit time is the excess X−s of the arrivals X over the service s whenever the buffer is full, Q=b. The cell-loss ratio is the ratio of the expected loss per unit time to the expected arrivals E[X] per unit time. It can be shown that, if b is large, then CLR(b;s) decays exponentially in b at the same rate δ as P[Q>q] decays with q:

$$CLR(b;s) \asymp e^{-\delta b}$$

The decay rate δ can be estimated by observing the traffic arrival process. In particular it can be derived from the rate function of the arrival process: if $W_t$ is the net amount of work added to the queue from time O to time t, then $$P[W_t/t > x] \asymp e^{-tI(x)}$$

where I(x) is the rate function. The decay rate δ can be directly calculated from the rate function:

$$\delta = \min_x \frac{I(x)}{x}$$

that is, δ is the minimum value of I(x)/x $W_t$ is called the workload process and is the fundamental process whose behaviour we are trying to understand.

The rate function of the workload process is often called the entropy of the workload process by analogy with thermodynamics; thermodynamic entropy is a rate function.

The rate function is directly related to the Scaled Cumulant Generating Function (SCGF) of the workload process:

$$\lambda(\theta) = \lim_{t \to \infty} \frac{1}{t} \ln E \ e^{\theta W_t}$$

where E denotes expectation.

The SCGF λ is related to I(•) by the Legendre transform $$I(x) = \max_\theta \{x\theta - \lambda(\theta)\}$$

The decay-rate δ can be calculated directly from λ

$$\delta(s) = \max\{\theta : \lambda(\theta) \leq 0\}$$

For this reason, the SCGF is the traffic descriptor relevant to resource allocation.

Let s be the rate at which arrivals at the queue are services. The SCGF of the arrival process, $\lambda^{(A)}(\theta)$ is related to the SCGF of the workload process λ(θ) by $$\lambda(\theta) = \lambda^{(A)}(\theta) - s\theta$$

As has previously been mentioned, there exists a known estimator based on time blocks of fixed periods T as described in the article by N. G. Duffield et al referred to previously. Time is divided into a number of blocks, each of period T. For a total period of KT, there are K such blocks. Then $$\hat{\lambda}^{(A)}(\theta) = \frac{1}{T} \ln \frac{1}{K} \sum_{k=1}^{K} e^{\theta X_k}$$

where $X_k$ is the number of arrivals in the $k^{th}$ block, is an estimate of the SCGF for the arrival process $\lambda_A(\theta)$. An estimate $\hat{\delta}$ of the decay rate δ can be obtained directly from $\hat{\lambda}(A)$ and can be used to approximate the probability of the queue size exceeding a given threshold.

However, an aspect of the present invention is concerned with the use of a different family of estimators, based on an arbitrary sequence of random times $\{T_n\}$. In particular, an alternative SCGF $\lambda_F$ may be used to calculate δ as follows:

$$\delta(s) = \max\{\theta : \lambda^{(T)}(\theta) \leq 0\}$$

where $$\lambda^{(T)}(\theta) := \lim_{n \to \infty} \frac{1}{n} \ln E e^{A_{T_n} - ST_n}$$

and $A_{T_n}$ is the total arrivals up to time $T_n$. The SCGF of the arrivals process can be calculated as $$\lambda^{(A)}(\theta) = \theta - \min\{s : \delta(s) \geq \theta\}$$

This produces a whole family of estimators: instead of time being divided into a number of blocks of fixed size T, it is divided into a sequence of K blocks of arbitrary large sizes $T_k$. This gives rise to the estimate $$\hat{\lambda}^{(T)}(\theta) = \frac{1}{n} \ln \frac{1}{K} \sum_{k=1}^{K} e^{\theta(X_k - ST_k)}$$

where $X_k$ is the number of arrivals in the $k^{th}$ block. The estimator $\hat{\delta}$ of the asymptotic decay rate is given by $$\hat{\delta}(s) = \max\{\theta : \hat{\lambda}^{(T)}(\theta) \leq 0\}$$

Thus, as previously mentioned, the first aspect of the present invention makes use of estimators of this family to derive the behaviour of the current traffic streams in real time. This estimator uses on-line measurements.

Each new algorithm for choosing an appropriate sequence of block sizes constitutes a new estimator of δ. One difficulty with the estimator $\hat{\delta}$ is that it has infinite variance. Since we choose the sizes of our blocks to be large enough to capture the asymptotics, there is some smoothing of the fluctuations when the activity is averaged over a block. One result of this is that there is a finite probability of the total activity in every block being less then or equal to the service capacity available in that block. If this happens, then $\hat{\lambda}^{(T)}(\theta) \leq 0$ for all θ>0 and so $\hat{\delta}$ is infinite.

In most situations the blocks of time will be sequential blocks of time of variable duration for each connection which would be defined by specifying the initial and final times for each block. Preferably the SCGF for each connection is updated for each block of time. In certain circumstances it may not be possible to measure the volume of traffic in each block of time. Further the duration of the blocks of time may be chosen randomly. This is particularly advantageous to ensure that resonance due to periodicities in the multiplex of the current connections is avoided. It is also appreciated that the duration of the blocks of time may in practice be dependent on random events occurring during carrying out of the method which could be caused by physical characteristics of the other portions of the network. A situation might arise where computing or other capacity might not be sufficient to allow the invention to be carried out at a particular time, thus the duration of the block of time would have to be varied. This could depend on the amount of traffic and on the computational requirements of other portions of the network.

The third aspect of the present invention thus provides that this problem be addressed by using the information available about the peak rate of the sources. Often the peak rate is a declared parameter of a source; if it is not declared, then the line-rate can be used instead. We incorporate the peak rate into our measurement of the SCGF by noting that the peak rate is the asymptotic slope of the true SCGF:

$$\text{peak rate} = \lim_{\theta \to \infty} \frac{\lambda^{(A)}(\theta)}{\theta}$$

If, for values of $\theta$ greater than some given $\theta_0$, we represent the SCGF by a straight line of slope the peak rate through $\lambda_A(\theta_0)$, then we obtain another convex function which is greater than the original SCGF. If we calculate $\delta$ using this new function, we get a conservative bound on the true value of $\delta$. We apply this procedure to our estimate $\hat{\delta}(A)$ of the SCGF:

$$\hat{\lambda}_{peak}^{(A)}(\theta) = \begin{cases} \hat{\lambda}^{(A)}(\theta) & \theta < \theta_0 \\ \hat{\lambda}^{(A)}(\theta_0) + p(\theta - \theta_0) & \theta \geq \theta_0 \end{cases}$$

No matter what the input data, $\lambda_{peak}^{(A)}(\theta)$ is always positive for some finite $\theta$ and so the new estimate of $\delta$ based on it is always finite and is always more conservative than the original estimate. It only remains to make an appropriate choice of $\theta_0$: this should be the largest value of $\delta$ with which we would like to work and is determined by the buffer-size and the smallest cell-loss with which we must deal. This may be the cell-loss corresponding to the highest quality guarantee that the system offers or, in the case of short-lived connections, the smallest cell-loss that could be observed, which is the inverse of the total number of cells transmitted. In either case, we get $$\theta_0 = -\frac{\ln(\text{minimum } CLR)}{\text{buffer-size}}$$

Consider now the service rate s is needed to ensure that the cell-loss ratio does not exceed some given level $\epsilon$. Once the rate function of the arrival process has been estimated, it can be used to answer this question by approximating $$CLR(b;s) \approx e^{-\delta(s)b}$$

This approximation gives an estimate of the minimum required service:

$$\hat{s}_\epsilon = \min\{s : CLR(b;s) \leq \epsilon\} = \hat{\lambda}_A(\theta_\epsilon)/\theta_\epsilon$$

where $\theta_\epsilon = -(\ln \epsilon)/q$. This minimum service is a measure, not of the mean bandwidth of the source, but of the bandwidth that the source effectively consumes in the queuing system, $\hat{\delta}_\epsilon$ is thus known as the effective bandwidth and the approximation $CLR(b;s) \approx e^{-\delta(s)b}$ is known as the effective bandwidth approximation.

This approximation is often very accurate but it is sometimes the case, especially with a multiplex of a large number of sources, that the approximation can be much improved by including a prefactor:

$$CLR(b;s) \approx \phi e^{-\delta(s)b}$$

where $\phi$ is based on an estimate of the cell-loss ratio in a small buffer. This is known as the refined effective bandwidth approximation. Since cell-loss is a very frequent event in small buffers, $\phi$ can be accurately estimated. One method of doing so is to note that if the buffer is full, then it implies that the arrivals in the current period either equal or exceed the available services, so that $$\{Q=b\} \subset \{X \geq s\}$$

If overflow is very frequent, then $\{Q=b\} \approx \{X \geq s\}$ and we can approximate the cell-loss ratio by $$CLR(b;s) = \frac{E[(X-s)I_{\{X \geq s\}}]}{E[X]}$$

At each queuing point in the network, the effective bandwidth of the traffic can be estimated. A newly arriving call will be routed across multiple queuing points. At each point, the question can be asked, is the current effective bandwidth, plus some upper bound on the effective bandwidth of the arriving call less than the rate at which the queue is served? If so, then the call can be accepted. It may be that the upper bound on the effective bandwidth is too pessimistic in which case the call is needlessly refused; thus the algorithm is conservative in accepting calls. Moreover, until a new estimate of the effective bandwidth is made for the traffic mix including the new call, the network must use the old estimate plus the upper bound on the recently arrived call as its interim estimate of the effective bandwidth of the traffic mix.

Arriving traffic is often described by crude parameters, possibly just the peak rate, or possibly by the ITU (and ATM Forum) defined Generic Cell Rate Algorithm (GCRA). Traffic confirming to GCRA (T,t), if passed through a queue of size t/T served at a rate 1/T, will not cause overflow. Traffic may be forced to conform to several GCRA constraints. Note that GCRA constraints appear in both ITU and ATM Forum standards for traffic control in ATM networks, and that policing a source to ensure that it obeys a set of GCRA constrains is simple and is currently performed in many switches.

The CAC algorithm works as follows. At all times an estimate of the effective bandwidth of the streams passing through a queuing point in the network is available. Let the difference between the total capacity and the estimate, that is the available capacity, be c. Let the total buffer available be b. Then a bound may be produced on the required bandwidth of the incoming stream and compared with c. Several possibilities then arise:

1. If only the peak rate (sometimes referred to as peak cell rate, PCR) of the new stream is available, then set the required bandwidth estimate to the PCR. Accept the call if $c \geq PCR$; otherwise, reject the call.
2. If a single GCRA constraint, GCRA $(T,\tau)$ is given, then set the effective bandwidth to $a/T$ if $b \geq \tau/T$ otherwise set the effective bandwidth to the line rate at the source. Accept the call if $c \geq 1/T$ and $b \geq \tau/T$; otherwise, accept the call if $c \geq$ source line rate; otherwise reject the call.
3. When the ATM Forum parameters PCR, SCR and IBT (peak cell rate, sustained cell rate and inter burst tolerance) are given, the traffic conforms to the GCRA constraints GCRA $(T,\tau)$ and GCRA $(T,O)$, with $T=1/PCR$, $T=1/SCR$, and $\tau=IBT$. We can assume that $T>T$.
   If the buffer is greater than $\tau/T$ then the effective bandwidth is the SCR. Otherwise the effective bandwidth is very nearly the PCR. More precisely:
   accept the call if $b \geq \tau/T$ and $c \geq 1/T$; otherwise,
   accept the call if $c \geq (\tau-bT+bT)/\tau T$; otherwise,
   reject the call.
   In all cases, the current estimate of the available bandwidth at the queuing centre is decreased by an amount equal to the bound on the required bandwidth of the incoming stream, until a new estimate is available based on measurements made after the call is accepted.

In using the SCGF for computations, it is, as mentioned already, advantageous to produce a polygonal approximation of the SCGF. This polygonal approximation is then iteratively refined to the scaled cumulative generating function by iteratively sampling the data as it passes through the switch. In effect each SCGF is replaced by a polygonal approximation which is computationally very advantageous. Ideally each SCGF is then iteratively updated each block of time a volume count of traffic is recorded. This can be mathematically described in the following terms: when the volume count $X_K$ in the in the $K^{th}$ time block becomes available, the SCGF $\lambda(\theta,s)$ for a service rate s is replaced by Thus, the present invention permits a control system of a network readily and rapidly to determine whether a new traffic stream arriving at the network can be accepted by the network. There are three components required to implement the current invention. These are the measurement component, the computational component and the decision component. Measurement must be performed either within the network switches or on measurement devices monitoring transmission links of the network. The computational component, which receives information from the measurement component and produces an estimate of the SCGF, can be located with the measurement component or can be implemented separately. The decision component receives information from the computational component and request from newly arriving traffic streams. This component can again be located within switches or may be separate entities within the network. The entities responsible for CAC decisions at various points in the network will have to intercommunicate to ensure that a route exists from source to destination acceptable at all points traversed.

Figure 2:
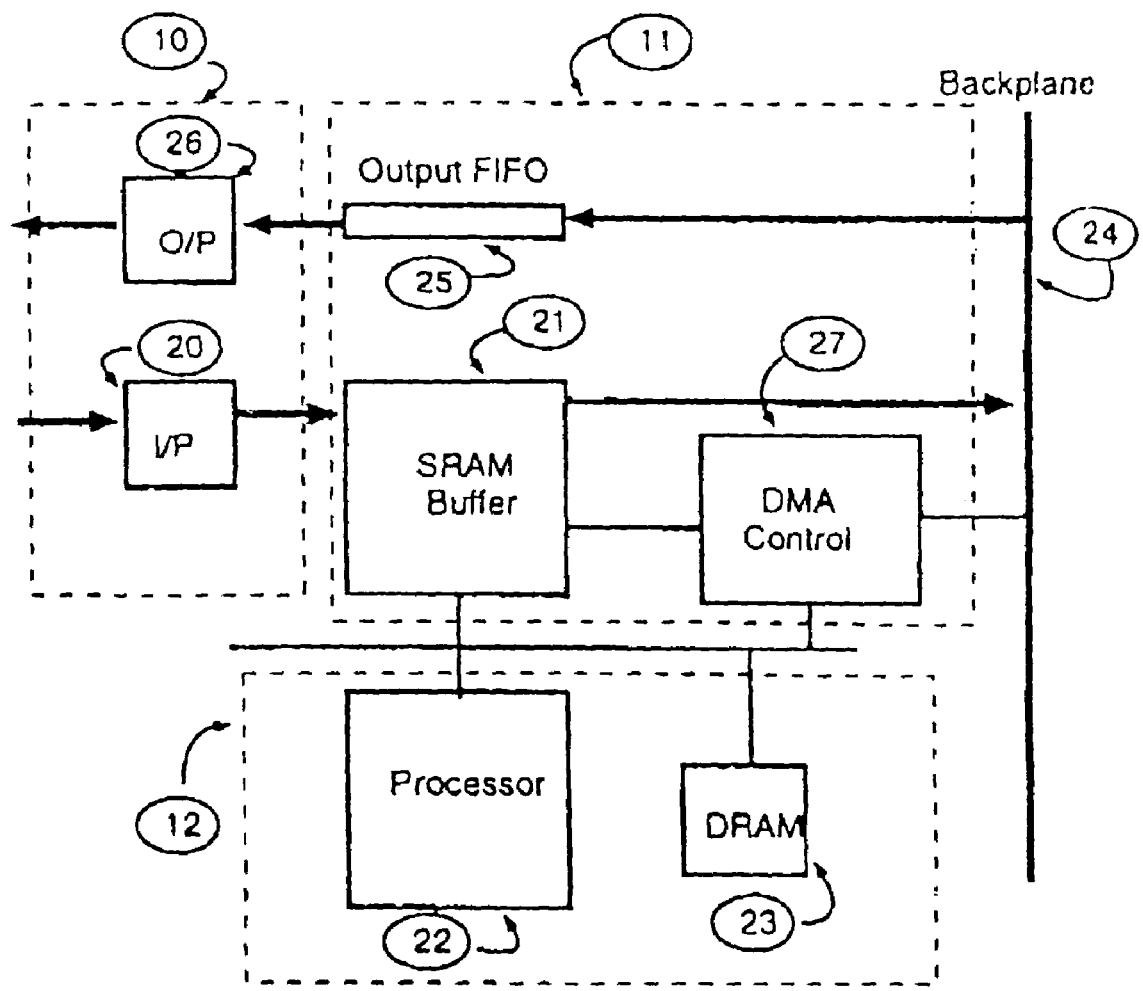
FIG. 2 is a diagrammatic representation of portion of a switch.

Thus, as illustrated in FIG. 2, a switch port which embodies a data network according to the present invention has three principal components, namely an onward transmission section 10, a buffer section 11, and a processor section 12. Several such switch ports are interconnected via a switch fabric (not shown) which is accessed through a backplane 24. A switch is a collection of switch ports, a switch fabric which interconnects them and ancillary elements such as a master clock generator and power supply.

The processing section 12 has a processor 22 and a memory 23 which contains programs and data to enable the connection admission control of the present invention to be carried out.

The transmission section 10 has an input unit 20 which receives data or signals from a transmission link connected to a number of network sources and passes those signals to an input buffer 21 of the buffer section 11. The input buffer 21 has sufficient capacity to buffer a plurality of signals. The processor 22 is notified of each arrival into the buffer 21 by means of the well known processor interrupt mechanism. The processor is thus able to perform the estimation of the resource use of traffic entering the buffer by processing and analysing the data.

The processor also controls the onward forwarding of information from the input buffer 21 and thus is able to control the acceptance and rejection of new data processing requests at this particular switching point in the network.

Onward transmission, for signals which are part of an accepted traffic stream, from the buffer 21 under the control of the processor 22 passes via the backplane 24 through a switch fabric (not shown) then via the backplane 24 to an output buffer 25 of, in the usual case, another switch port and then to an output unit 26 of that switch port's transmission unit 10.

Specific examples of components, and further processing details of the switch illustrated in the Figure are discussed in the article by R. J. Black et al referred to above. In the present invention, however, the processor 22 is programmed so as to carry out the estimating function of the present invention defined previously. The incorporation of such processing methods into appropriate programming of the processor 22 will be readily appreciated by a person skilled in the art, and therefore will not be discussed in more detail.

In the example given, it is the input buffer which is used as the point for estimating resource demand by the existing traffic stream. The use of the output buffer for this purpose is also possible and indeed may prove more advantageous.

Thus a person skilled in the art may readily form the present invention by use of a switch described above, similar switches, or switches having equivalent effects, and by implementing the computational and decision functions described above using known computer techniques.

In summary managing the performance of the data network comprises the steps of processing, analysing and abstracting a data characteristic for data passing through a switch node of the data network stored in the buffer.

When the switch receives a data processing request from a network source the processor processes, analyses and derives a data model from the new data processing request.

The data model and the data characteristic are then combined to produce a switch throughput indicator. A maximum allowable switch throughput parameter is then identified by the processor and this is compared with switch throughput parameter to produce a request response which is then communicated back to the network source.

An important feature of the invention center around the manner in which a polygonal approximation is generated, whether from declared parameters of a data request or not.

This polygonal approximation is then iteratively refined to the scaled cumulative generating function by iteratively sampling the data as it passes through the switch.

Within the context of the teaching of the present invention the SCGF $\lambda(\theta,s)$ of each connection may be calculated as:

$$\lambda(\theta, z) = \frac{\log 1}{K} \sum_{k=1}^{k=K} e^{\theta(X_K - sT_K)}$$

Where:
$X_k$ is the volume of traffic recorded in the $k^{th}$ time block
$T_k$ is the duration of the $k^{th}$ time block and
$K$ is the number of time blocks in which the volume of traffic was recorded up to the current time.

Where each SCGF is replaced by a polygonal approximation and is iteratively updated each time a volume count of traffic is recorded so that when the volume count $X_K$ in the $K^{th}$ time block becomes available, the SCGF $\lambda(\theta,s)$ for a service rate s may be replaced by $$\frac{Ke^{\lambda(\theta s)} + e^{\theta(X_K - sT_K)}}{K+1}$$

where $T_K$ is the length of the $K^{th}$ time block.

In this context, a value $\theta_0$ of the parameter $\theta$ may be chosen and the calculated values of $\lambda(\theta,s)$ for values of $\theta$ greater than $\theta_0$ may be replaced by $\lambda(\theta_0,s)+(p-s)(\theta-\theta_0)$ where p is the Peak Cell-Rate (PCR) of the connection.

In another arrangement a value $\theta_0$ of the parameter $\theta$ is chosen to be $$-\frac{\log(\text{target QoS})}{\text{switch buffer size}}$$

It is possible using the teaching of the invention to predict the SCGF $\lambda(\theta,s)$ of a connection requesting admission from its declared parameter in which $\lambda(\theta,s)=(p-s)\theta$ where p the is declared Peak Cell-Rate (PCR).

It is also possible to predict the SCGF $\lambda(\theta,s)$ of a connection requesting admission from its declared parameter in which $$\lambda(\theta, s) = \begin{cases} (\sigma - s)\theta, & \theta \leq \frac{c}{\sigma\tau}, \\ \frac{c}{\tau}\left(1 - \frac{t}{\tau}\right) + (t - s)\theta, & \theta > \frac{c}{\sigma\tau}. \end{cases}$$

where p is its declared Peak Cell-Rate (PCR),
$\sigma$ is its declared Sustainable Cell-Rate (SCR),
$\sigma$ is its declared Intrinsic Burst Tolerance (IBT) and
$c=-\log$ (target QoS).

The invention is not limited to the embodiment hereinbefore described but may be varied in both construction and detail within the scope of the appended claims.

The invention claimed is:

1. A method of maintaining a target quality of service in a network switch behaving as a buffer of fixed size transmitting a multiplex of current connections at a constant service rate by controlling the admission of a connection requesting admission on the basis of a declared parameter comprising the steps of:

recording the volume of traffic for each current connection over a block of time;
estimating the scaled cumulant generating function (SCGF) $\lambda(\theta,s)$ for each connection;
summing all the estimated SCGFs to obtain an aggregate SCGF;
using the aggregate SCGF to obtain an estimated bandwidth requirement for the multiplex of current connections;
providing a predicted SCGF for the connection requesting admission from the declared parameter;
predicting the bandwidth requirement of the connection requesting admission from the predicted SCGF;
summing the estimated and predicted bandwidth requirements;
accepting the connection requesting admission when the sum of the bandwidth requirements is less than the service rate of the switch; and
wherein the SCGF $\lambda(\theta,s)$ of each connection is calculated as $$\lambda(\theta, z) = \frac{\log 1}{K} \sum_{k=1}^{k=K} e^{\theta(X_K - sT_K)}$$

Where
$X_k$ is the volume of traffic recorded in the $k^{th}$ time block
$T_k$ is the duration of the $k^{th}$ time block and
$K$ is the number of time blocks in which the volume of traffic was recorded up to the current time.

2. A method as claimed in claim 1 in which the target quality of service (QoS) parameter is the cell loss ratio.

3. A method as claimed in claim 2 in which there is a plurality of sequential blocks of time of variable duration for each connection defined by specifying the initial and final times for each block and in which the SCGF for each connection is updated for each block of time.

4. A method as claimed in claim 2 in which the duration of the block of time is chosen randomly whereby resonance due to periodicities in the multiplex of current connection is avoided.

5. A method as claimed in claim 2 in which the duration of the block of time is dependent on random events occurring during the carrying out of the method.

6. A method as claimed in claim 1 in which there is a plurality of sequential blocks of time of variable duration for each connection defined by specifying the initial and final times for each block and in which the SCGF for each connection is updated for each block of time.

7. A method as claimed in claim 1 in which the duration of the block of time is chosen randomly whereby resonance due to periodicites in the multiplex of current connection is avoided.

8. A method as claimed in claim 1 in which the duration of the block of time is dependent on random events occurring during the carrying out of the method.

9. A method as claimed in claim 1 in which the SCGF is used in an effective bandwidth approximation to provide the estimated bandwidth requirement for the multiplex of current connections.

10. A method as claimed in claim 1 in which the bandwidth requirement is obtained and then the steps are performed of estimating the quality of service the multiplex of current connections would experience if it were queued in a small buffer and refining the estimate of the bandwidth requirement using the estimated quality of service.

11. A method as claimed in claim 1 in which the steps are performed of:
choosing a virtual buffer of size smaller than the buffer size for the switch;
running a simulation of the aggregate of the current connections in the virtual buffer;
recording the quality of service; and
providing a refined effective bandwidth requirement.

12. A method as claimed in claim 1 in which each SCGF is replaced by a polygonal approximation.

13. A method as claimed in claim 1 in which each SCGF is replaced by a polygonal approximation and is iteratively updated each time a volume count of traffic is recorded so that when the volume count $X_K$ in the $K^{th}$ time block becomes available, the SCGF $\lambda(\theta,s)$ for a service rate s is replaced by $$\log\left(\frac{ke^{\lambda(\theta,s)} + e^{\theta(x_k - sT_k)}}{K+1}\right)$$

where $T_K$ is the length of the $K^{th}$ time block.

14. A method as claimed in claim 1 in which the SCGF is iteratively updated and the starting value of the SCGF in the iterative updating is the predicted SCGF of the connection requesting admission based on the declared parameter of the connection.

15. A method as claimed in claim 1 in which:
a value $\theta_0$ of the parameter $\theta$ is chosen; and
the calculated values of $\lambda(\theta,s)$ for values of $\theta$ greater than $\theta_0$ are replaced by $$\lambda(\theta_0,s)+(p-s)(\theta-\theta_0)$$

where p is the Peak Cell-Rate (PCR) of the connection.

16. A method as claimed in claim 1 in which:
a value $\theta_0$ of the parameter $\theta$ is chosen to be $$-\frac{\log\ (\text{target QoS})}{\text{switch buffer-size}}$$

17. A method as claimed in claim 1 of predicting the SCGF $\lambda(\theta,s)$ of a connection requesting admission from its declared parameter in which $$\lambda(\theta,s)=(p-s)\theta$$

where p the is declared Peak Cell-Rate (PCR).

18. A method as claimed in claim 1 of predicting the SCGF $[\lambda(\theta,s)]$ of a connection requesting admission from its declared parameter in which $$\lambda(\theta,s) = \begin{cases} (\sigma - s)\theta, & \theta \leq \dfrac{c}{\sigma t}, \\ \dfrac{c}{\tau}\left(1 - \dfrac{t}{\tau}\right) + (\phi - s)\theta, & \theta > \dfrac{c}{\sigma\tau}. \end{cases}$$

where p is its declared Peak Cell-Rate (PCR),
σ is its declared Sustainable Cell-Rate (SCR),
τ is its declared Intrinsic Burst Tolerance (IBT) and
c=−log (target QoS).

19. A data network comprising:
a network switch behaving as a buffer of fixed size when transmitting a multiplex of current connections at a constant service rate;
a plurality of connectors feeding the switch;
means for recording the volume of traffic of current connections for each current connector to the switch over a block of time;
means for estimating the scaled cumulant generating function (SCGF) $\lambda(\theta,s)$ for each current connection recorded;
means for summing the estimated SCGFs to obtain an aggregate SCGF;
means for using the aggregate SCGF to obtain an estimated bandwidth requirement for the multiplex of current connections;
means for presenting a new current connection requesting admission to the network by providing a declared parameter of the connection requesting admission;
prediction means for providing a predicted SCGF for the new current connection requesting admission to the network from the declared parameter;
means for predicting the bandwidth requirement of the connection requesting admission from the predicted SCGF;
means for summing the estimated and predicted bandwidth requirements for the switch to produce a revised bandwidth requirement; and
control means for deciding to admit the connection requesting admission on the basis of the revised bandwidth requirement for the switch and wherein
the means for estimating the SCGF $\lambda(\theta,s)$ for each current calculation recorded calculates the SCGF $\lambda(\theta,s)$ as $$\lambda(\theta, z) = \frac{\log 1}{K}\sum_{k=1}^{k=K} e^{\theta(X_K - sT_K)}$$

Where
$X_k$ is the volume of traffic recorded in the $k^{th}$ time block
$T_k$ is the duration of the $k^{th}$ time block and
K is the number of time blocks in which the volume of traffic was recorded up to the current time.

20. A network as claimed in claim 19 in which the means for recording the volume of traffic includes means for specifying the initial and final times for each block of time to control the duration of the block of time.

21. A network as claimed in claim 20 in which the means for using the aggregate SCGF to obtain an estimated bandwidth requirement includes processing means for carrying out modelling of the current connections to obtain a refined effective bandwidth requirement.

22. A network as claimed in claim 19 in which the means for recording the volume of traffic includes means for specifying the initial and final times for each block of time in a random fashion to vary the duration of each block of time.

23. A network as claimed in claim 19 in which the means for recording the volume of traffic includes means for specifying the initial and final times for each block of time having regard to the capacity of the remainder of the network to handle the computations.

24. A network as claimed in claim 19 in which the prediction means includes means for providing the predicted SCGF as a polygonal approximation.

25. A network management system for a multiplex of current connections providing a real time admission control over a connection requesting admission comprising:
- a network switch capable of transmitting signals at a constant service rate;
- means for providing a model of the switch in terms of a buffer of fixed size;
- a plurality of connectors feeding the switch;
- means for recording the volume of traffic of current connections for each current connector to the switch over a block of time;
- means for estimating the scaled cumulant generating function (SCGF) $\lambda(\theta,s)$ for each current connection recorded;
- means for summing the estimated SCGFs to obtain an aggregate SCGF;
- means for using the aggregate SCGF to obtain an estimated bandwidth requirement for the multiplex of current connections;
- means for presenting a new current connection requesting admission to the network by providing a declared parameter of the connection requesting admission;
- prediction means for providing a predicted SCGF for the new current connection requesting admission to the network from the declared parameter;
- means for predicting the bandwidth requirement of the connection requesting admission from the predicted SCGF;
- means for summing the estimated and predicted bandwidth requirements for the switch to produce a revised bandwidth requirement; and
- a control means for receiving the request of the new current connection requesting admission and the revised bandwidth requirement and for deciding to admit the connection requesting admission on the basis of the revised bandwidth requirement for the switch, and wherein the means for estimating the sealed cumulant generating function (SCGF) $\lambda(\theta,s)$ for each current connection recorded calculates the SCGF $\lambda(\theta,s)$ as $$\lambda(\theta, z) = \frac{\log 1}{K} \sum_{k=1}^{k=K} e^{\theta(X_K - sT_K)}$$

Where $X_k$ is the volume of traffic recorded in the $k^{th}$ time block $T_k$ is the duration of the $k^{th}$ time block and K is the number of time blocks in which the volume of traffic was recorded up to the current time.

26. The network management system as claimed in claim 25 in which the means for recording the volume of traffic includes means for specifying the initial and final times for each block of time to control the duration of the block of time.

27. The network management system as claimed in claim 25 in which the means for recording the volume of traffic includes means for specifying the initial and final times for each block of time in a random fashion to vary the duration of each block of time.

28. The network management system as claimed in claim 25 in which the means for recording the volume of traffic includes means for specifying the initial and final times for each block of time having regard to the capacity of the remainder of the network to handle the computations.

29. The network management system as claimed in claim 25 in which the means for using the aggregate SCGF to obtain an estimated bandwidth requirement includes processing means for carrying out modelling of the current connections to obtain a refined effective bandwidth requirement.

30. The network management system as claimed in claim 25 in which the prediction means includes means for providing the predicted SCGF as a polygonal approximation.

* * * * *